United States Patent Office 3,272,558
Patented Sept. 13, 1966

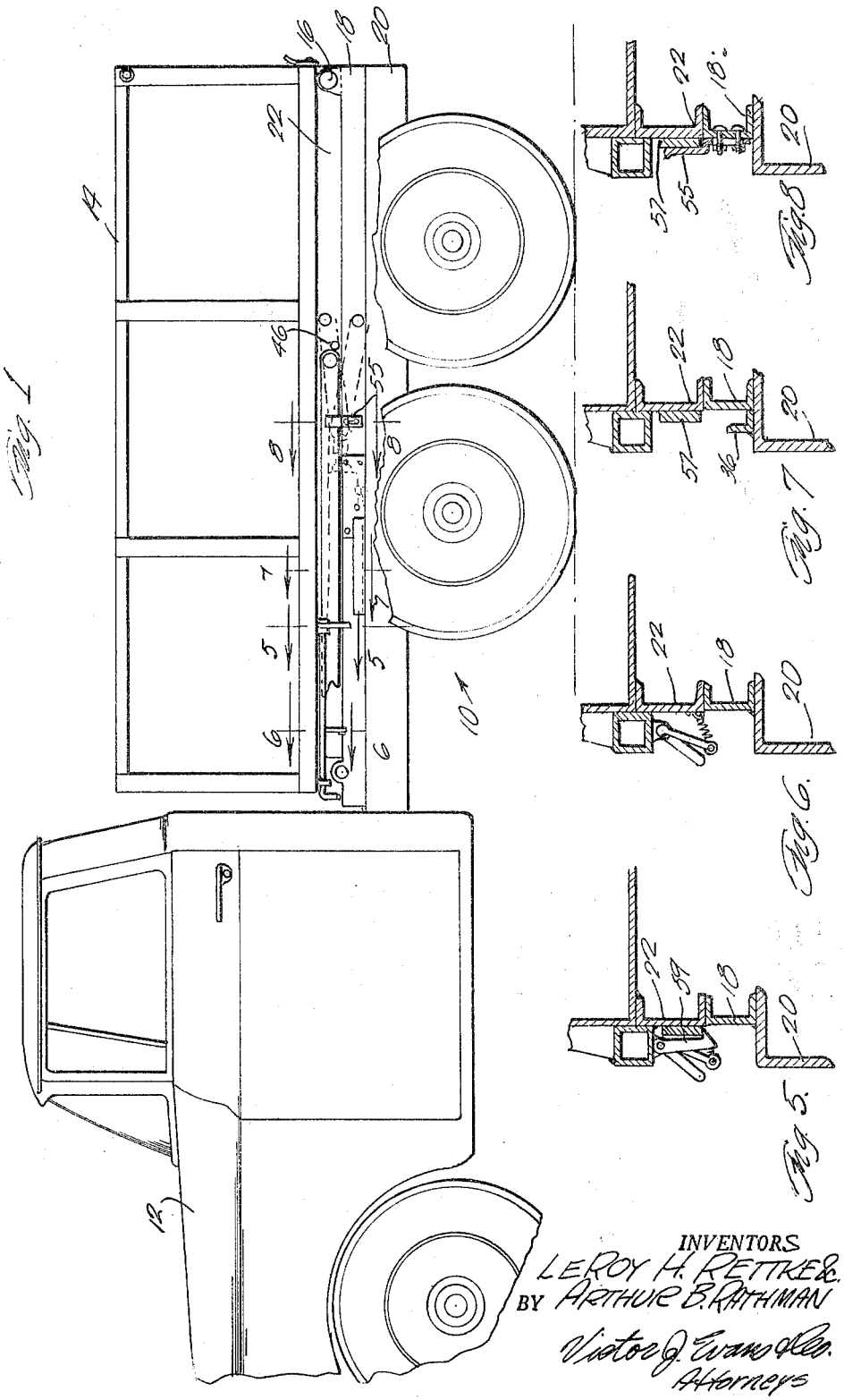

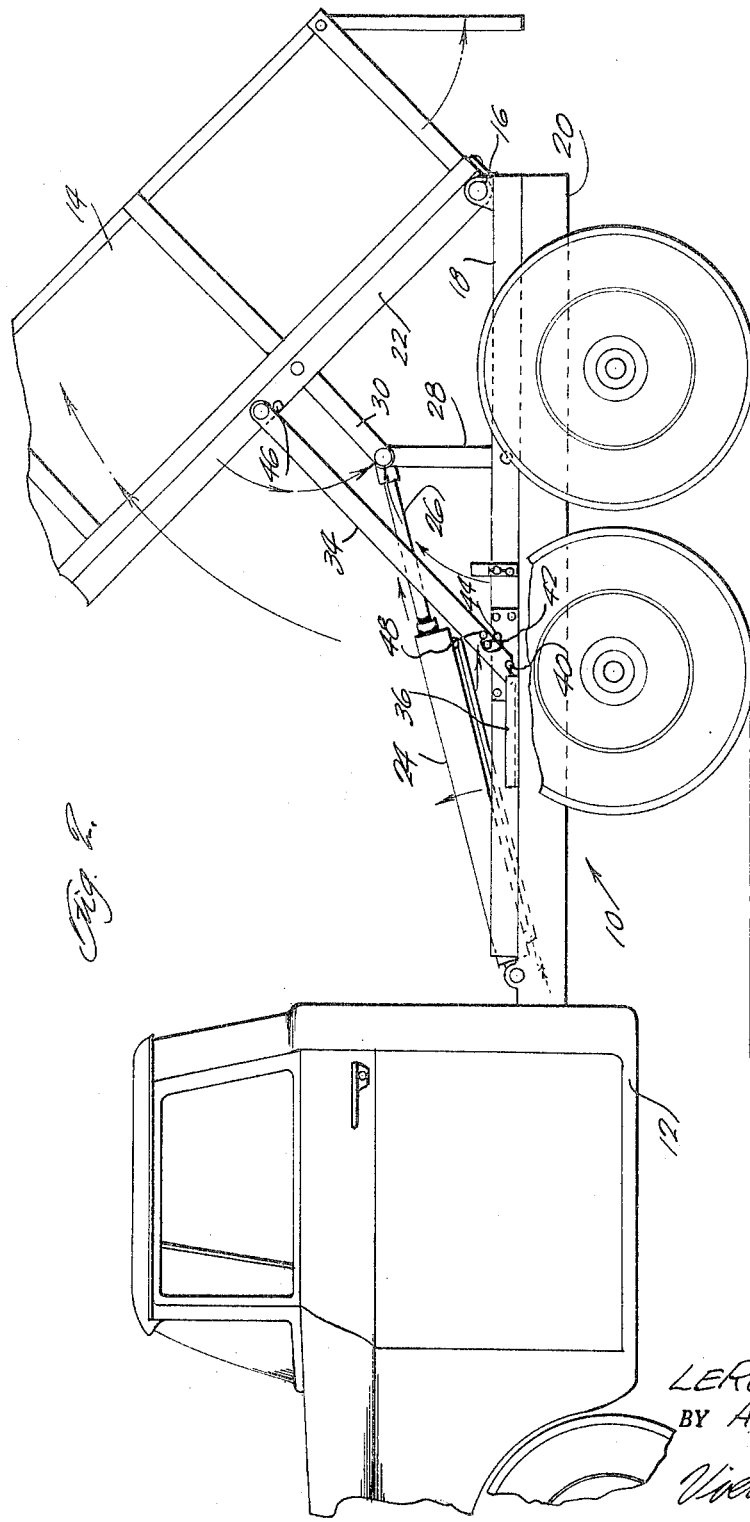

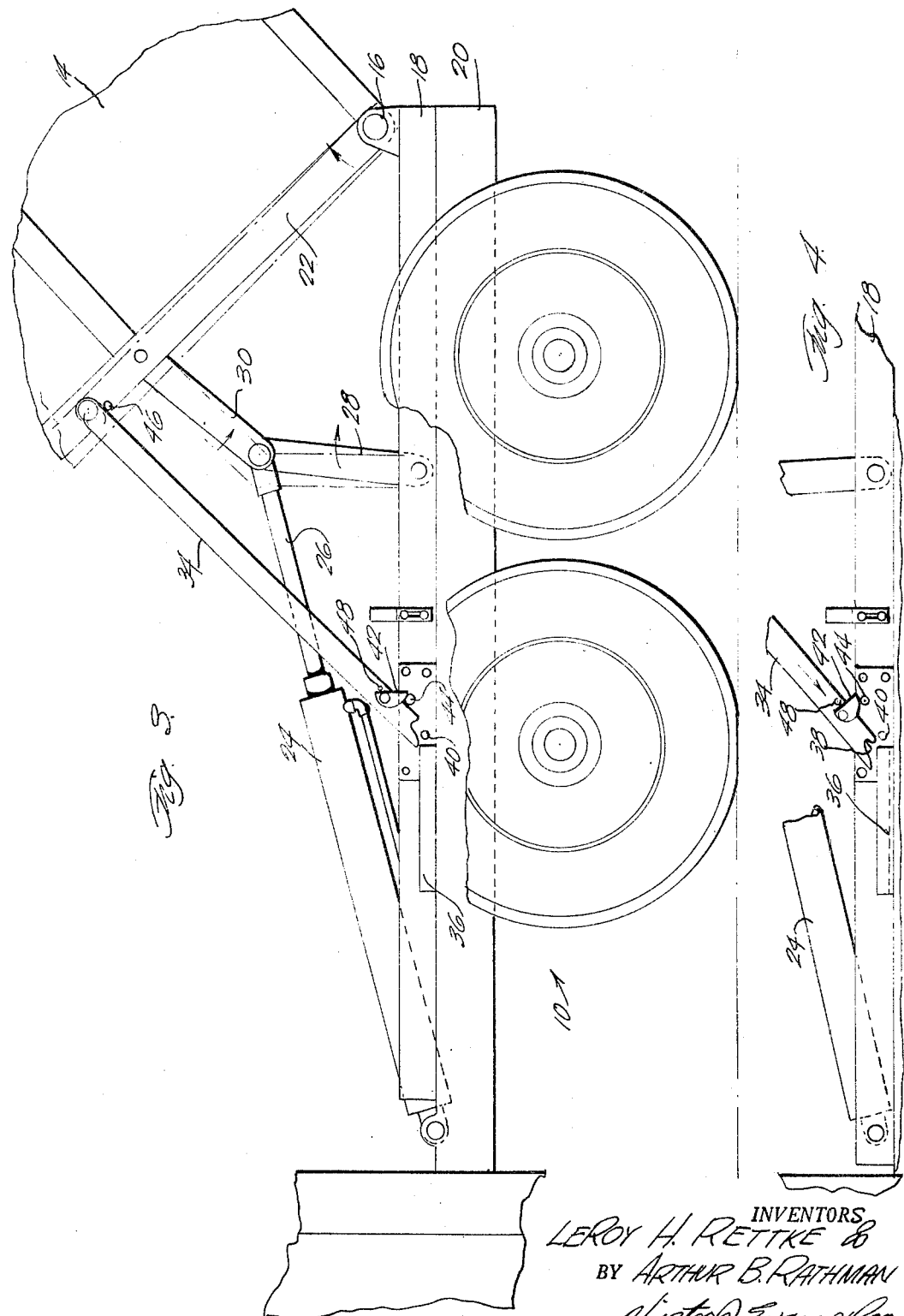

3,272,558
POSITIVE AUTOMATIC DUMP BODY HOIST SAFETY LOCK
Arthur B. Rathman, 520 S. 10th St., and Le Roy H. Rettke, 920 7th St. S., both of St. James, Minn.
Filed Nov. 16, 1964, Ser. No. 411,303
4 Claims. (Cl. 298—22)

The present invention relates in particular to a positive automatic hoist safety lock for trucks and dumping vehicles, in which there is an elevating or hoist mechanism that is locked in a positive manner in a raised position, and includes means for releasing the safety lock without sacrificing and losing the advantages of the positive automatic hoist safety lock.

It is therefore a primary object of the invention to provide a novel and improved safety device that is positive in nature for automatic hoist of dump trucks for preventing accidental falling or lowering of the vehicle body from its elevated position.

A further object of the invention is to provide a safety device which is of simple construction, reliable in operation, and simple to maintain.

The invention contemplates providing a locking bar that is pivotally mounted on a box frame at one end, and in which the other end slides along a channel mounted on the truck frame, and in which the said other end continues along said channel until the box is hoisted, a locking bolt in said channel for engaging the locking bar when in the hoisted position to lock the box in the raised position, and cam means cooperative with a bolt and rivet configuration for permitting the box to return to a lowered position after the box has been extended into a full hoist position and allowing the locking bar to be displaced from the locking bolt in the downward movement of the locking bar.

Other objects, advantages and improved results will be apparent from the following description of the invention in conjunction with the accompanying drawings in which:

FIGURE 1 is a side elevational view of a truck body and load carrying box, in which there is provided the positive automatic hoist safety lock of the present invention;

FIGURE 2 is a corresponding side elevational view of the truck and locking bar arrangement of the invention, in which the box is shown in its raised or hoist position;

FIGURE 3 is an enlarged side elevational view showing the locking bar and components of the safety lock in which the box is extended to a full hoist position, as shown in full line, compared with the dotted line position when the box was in the positive safety lock position;

FIGURE 4 shows the detail operation of the locking bar and the attending mechanism operative on the hoist frame in accordance with the preferred embodiment of the invention; and FIGURES 5, 6, 7 and 8 are respectively cross-sectional views taken along lines 5—5, 6—6, 7—7, and 8—8, respectively, in FIG. 1.

Referring now to the drawings, there is shown a truck 10 having a cabin 12 and a dumping body or box 14. The box 14 is shown being pivotally or hingedly connected at shaft 16 mounted on a hoist frame 18 secured to a truck frame 20. A box frame 22 extends along the lower portion of the box 14, as shown. The hoist frame secures the shaft 16 at one end thereof, and at the other end thereof is pivotally mounted a hydraulic jack 24 for raising the box 14, as shown in FIG. 2, or for lowering the box to a rest position as shown in FIG. 1. The hydraulic jack 24 includes a shaft 26 and lift arms 28, 30.

Many of the essential components of the positive automatic hoist safety lock are mounted on the hoist frame. A locking bar 34 is pivotally mounted on the box frame, and the free end of the locking bar slides along a channel 36 that is mounted on the hoist frame 18. As the box 14 is raised by the hydraulic jack 24 to its normal dump position, as shown in the arrows of FIG. 2, the locking bar 34 passes the length of the channel 36 until a recess 38 in the locking bar 34 engages a locking bolt 40 at the end of said channel. The locking bolt and the recess 38 retain the box 14 in a locked and fixed hoist position.

When it is desired to lower the box 14 from the raised position, the hydraulic motor 24 is driven to raise the box 14 to a position beyond the hoist position, as shown in the full line arrangement of FIG. 3, and the attending arrows thereof, so that the locking bar 34 is raised in a distended position from the locking bolt 40. A half-moon cam 42 rides over a mounting bolt 44. A stop pin 46 mounted on the box frame serves as a buffer or stop means in the event that an operator of the hydraulic motor 24 raises the box 14 too high, thus preventing the lock bar 34 from falling backward beyond the bolt 44. Where the box 14 is raised to a position beyond the hoist position, the locking bar 34 is maintained in a substantially depending perpendicular relation with respect to the bottom of the box frame 22, and as the box 14 is lowered by the hydraulic motor 24, the locking bar 34 is correctly oriented with respect to the bolt 44 positioned on the hoist frame 18. A stop pin 48 is mounted on the locking bar 34 to limit the displacement of the half-moon cam 42, as shown in FIG. 4, so that when the locking bar 34 proceeds downwardly, the half-moon cam 42 provides that the locking bar 34 ride over the locking bolt 40 since the half-moon cam rides along the bolt 44. In this manner, the locking bar 34 is again returned to the channel 36 and it is therefore possible to return the box to its lower position, as shown in FIG. 1.

When the box 14 is returned to rest on the hoist frame 18, there is provided a spring catch 59 for retaining the bar 34 secured to the box frame 22, which spring catch and tripping mechanism therefor is shown in FIGS. 5 and 6. FIGS. 7 and 8 show the adjustable slot 55 and the push bar 57 for receiving the box and to allow the catch mechanism 59, shown in FIG. 5, to engage the push bar 57.

While there has been shown and described the preferred embodiment of the invention, it is understood that this is primarily for the purpose of illustrating the principles of the invention and that the details of construction of the positive automatic hoist safety lock may be modified and changed and the safety device may be used with types of elevating mechanisms and driving means other than the lift frame and hydraulic motor as illustrated hereinabove, all within the spirit and scope of the present invention.

What is claimed is:

1. A positive automatic hoist safety lock comprising a truck frame, a box frame, a hoist frame mounted on the truck frame and having hydraulic jack means on the hoist frame to raise the box frame, a channel mounted on the hoist frame, a locking bar pivotally mounted on the box frame at one end thereof and the other end slidably engaging along the channel on the hoist frame, said other end having a recess therein and continuing along said channel as the box is raised by the hydraulic jack until the box is hoisted, a locking bolt mounted on the hoist frame for engaging the recess at the other end of the locking bar when the box is hoisted to lock the box in the hoist position, a half-moon cam pivotally mounted on said locking bar for riding over a bolt on the hoist frame, a stop pin mounted on the locking bar to limit the displacement of said half-moon cam and allow the locking bar to override engagement of the locking bolt and return the free end of the locking bar into said channel while the box is being lowered onto the hoist frame.

2. The invention according to claim 1 wherein a stop pin on the box frame is provided to limit the angular displacement of the locking bar when in the hoist position and preventing the locking bar from falling beyond reach of engagement with said locking bolt.

3. The invention according to claim 1 wherein a spring catch means is provided for holding the locking bar in place, and hand-operating means to release said spring catch.

4. A positive automatic hoist safety lock comprising a hoist frame, a box frame, said hoist frame having a hydraulic jack for raising the box frame, a locking bar pivotally mounted at an intermediate point on the box frame and having the other end provided with a recess for engaging a locking bolt, a channel, for providing sliding engagement of the free end of the locking bar therealong until said recess engages the locking bolt, a half-moon cam mounted on said locking bar in pivotal relation thereto and engaging a bolt mounted on said hoist frame, said half-moon cam riding over said bolt when the box is raised to a full hoist position, a stop pin mounted on the locking bar to limit displacement of said half-moon cam, and when the box has been extended beyond said full hoist position said stop pin forces the half-moon cam to ride over said locking bolt so that the locking bar and its recess pass over and out of engagement with said locking bolt and return to said channel as the box is lowered.

References Cited by the Examiner
UNITED STATES PATENTS

| | | | |
|---|---|---|---|
| 1,523,525 | 1/1925 | Hatashita | 298—17 |
| 2,407,012 | 9/1946 | Hutchinson | 298—17 |

FOREIGN PATENTS

| | | |
|---|---|---|
| 1,063,833 | 5/1954 | France. |

BENJAMIN HERSH, *Primary Examiner.*

R. J. JOHNSON, *Assistant Examiner.*